(12) United States Patent
Richards et al.

(10) Patent No.: US 9,742,971 B2
(45) Date of Patent: Aug. 22, 2017

(54) DUAL CAMERA SYSTEM ZOOM NOTIFICATION

(71) Applicant: Motorola Mobility LLC, Chicago, IL (US)

(72) Inventors: By-Her W Richards, Lincolnshire, IL (US); Kevin W Johnson, Mundelein, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/628,415

(22) Filed: Feb. 23, 2015

(65) Prior Publication Data
US 2016/0248955 A1    Aug. 25, 2016

(51) Int. Cl.
*H04N 5/232*    (2006.01)
*H04N 5/225*    (2006.01)

(52) U.S. Cl.
CPC ........ *H04N 5/2257* (2013.01); *H04N 5/2254* (2013.01); *H04N 5/2258* (2013.01); *H04N 5/23212* (2013.01); *H04N 5/23293* (2013.01); *H04N 5/23296* (2013.01)

(58) Field of Classification Search
CPC ...... G02B 7/102; G02B 15/173; H04N 5/232; H04N 5/2254; H04N 5/23296
See application file for complete search history.

(56) References Cited

U.S. PATENT DOCUMENTS

2006/0187312 A1* 8/2006 Labaziewicz .......... H04N 5/225
                                                                    348/218.1
2014/0375834 A1* 12/2014 Lohan .................. G06Q 10/101
                                                                    348/211.99

* cited by examiner

*Primary Examiner* — Twyler Haskins
*Assistant Examiner* — Fayez Bhuiyan

(57) ABSTRACT

In embodiments of dual camera system zoom notification, a dual camera system includes a first imager and a second imager that are designed to support synthetic optical zoom of a scene. A camera controller is implemented to determine that the synthetic optical zoom is not supported to capture an image of the scene with the dual camera system. The camera controller can then initiate a message for a user of the dual camera system to indicate that the synthetic optical zoom is not supported to capture the image of the scene. The message can be displayed to indicate that the synthetic optical zoom is not supported and/or to indicate that digital zoom is activated. A user can also be provided with selectable options that enable the user to decide the zoom operation when the dual camera system is not operational for synthetic optical zoom.

20 Claims, 4 Drawing Sheets

DUAL CAMERA SYSTEM ZOOM NOTIFICATION

BACKGROUND

Portable devices, such as mobile phones, tablet devices, digital cameras, multimedia devices, and other types of computing and electronic devices can include a camera device that is utilized to capture digital images. Some camera devices are designed as a dual camera system having two imagers, with camera lenses and image sensors, and can be implemented for a synthetic optical zoom and/or digital zoom. Some digital camera devices lack the optics for optical zoom and rely on digital zoom to zoom-in on a subject of a scene. Other digital camera devices do have zoom lenses for optical zoom, but apply digital zoom automatically once the optical zoom limits of the lenses have been reached.

Generally, optical zoom allows a user to mechanically vary the focal length of a camera lens, thus changing the angle of view when zooming-in or zooming-out on a subject of a scene as viewed through the lens. The range of optical zoom for a camera lens is limited by the longest and shortest focal lengths of the lens. Typically, digital zoom can be utilized after the optical zoom of a camera lens has reached its longest focal length limit. The digital zoom is then accomplished electronically without adjustment of the camera lens optics. However, no optical resolution is gained because an image is cropped-down to a zoomed-in area with the same aspect ratio as the original image, resulting in poorer image quality than would be achieved with optical zoom.

BRIEF DESCRIPTION OF THE DRAWINGS

Embodiments of dual camera system zoom notification are described with reference to the following Figures. The same numbers may be used throughout to reference like features and components that are shown in the Figures.

DETAILED DESCRIPTION

Figure 1:
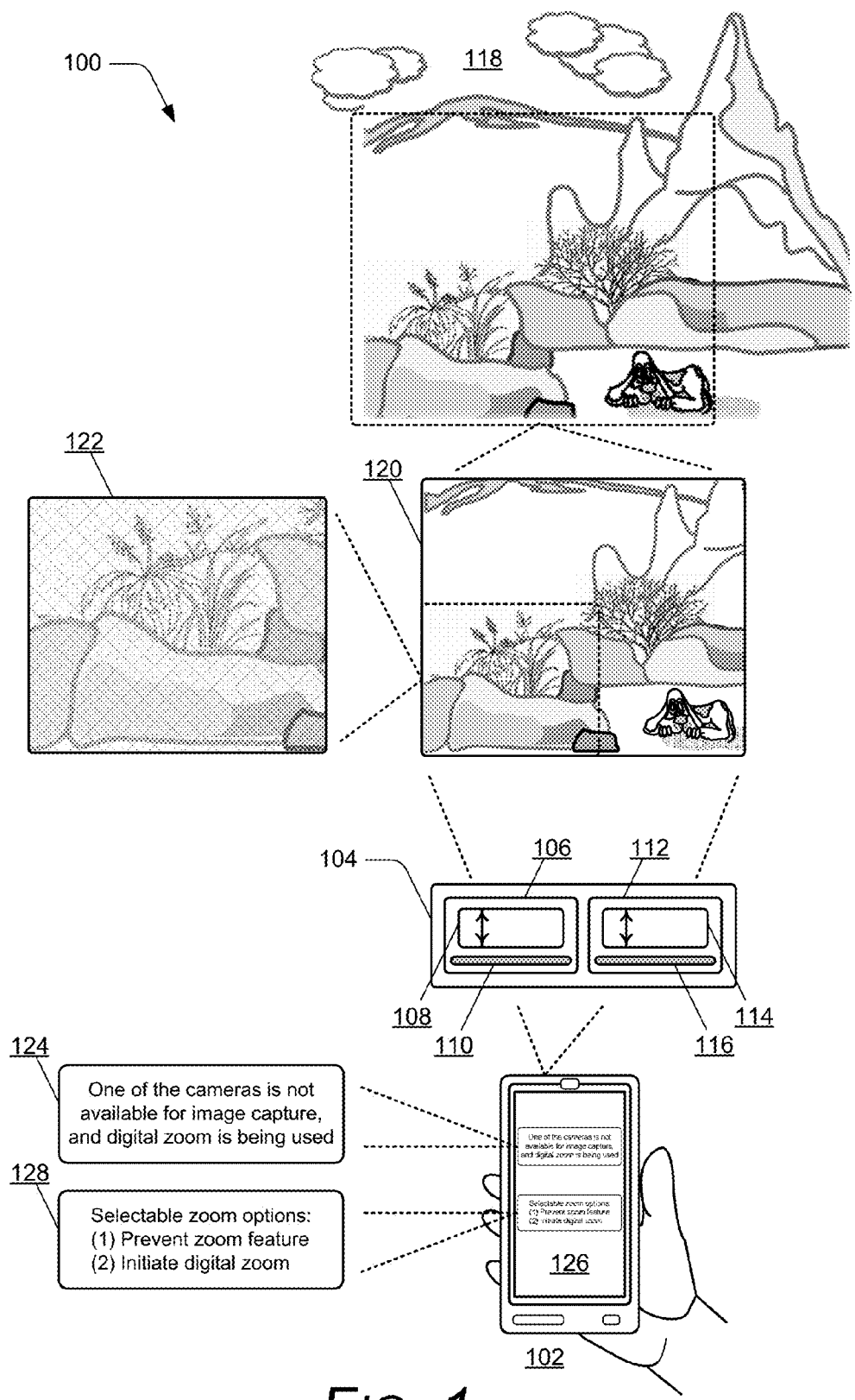
FIG. 1 illustrates an example system in which embodiments of dual camera system zoom notification can be implemented.

Embodiments of dual camera system zoom notification are described for any type of portable device, such as a mobile phone, tablet device, digital camera, multimedia device, and other types of computing and/or electronic devices that are designed with a dual camera system and implemented for synthetic optical zoom and digital zoom. In implementations, a dual camera system has two imagers, each including a camera lens and an image sensor to capture a digital image as viewed through the camera lenses. In implementations, one of the imagers of the dual camera system is a standard camera with a standard angle of view, and the other imager is a camera with a narrower angle of view. A computational imaging algorithm for synthetic optical zoom can be used to merge one image from the standard camera, and the other image from the second camera at the same scene to generate a high-quality zoomed image, competitive to an optical zoomed image. There is a mathematical limitation of the computational imaging algorithm in the dual camera system, and digital zoom may be used when a limit of synthetic optical zoom is reached.

However, digital zoom is an image manipulation technique implemented either in software or hardware that can result in visual degradation of image quality that would otherwise be avoided with synthetic optical zoom. A poor user experience results when a user takes a photo (e.g., captures a digital image) that turns out blurry or pixelated due to digital zoom rather than utilizing optical zoom. In addition to applying digital zoom when the synthetic optical zoom capability of a computational imaging algorithm has reached a limit, a dual camera system may initiate digital zoom automatically in other use scenarios, such as if one of the imagers has either temporarily or permanently malfunctioned. The user may be unaware that synthetic optical zoom is not being utilized, resulting in the poorer image quality and a negative user experience with the camera device.

Accordingly, the described aspects of dual camera system zoom notification can be implemented to notify a user of a camera device with a dual camera system when digital zoom is initiated, particularly when the user is unaware that the synthetic optical zoom of a computational imaging algorithm is not being utilized. A message can be provided for the user, such as in the form of a displayed message, a displayed symbol or image, an audio indication, as haptic feedback, and/or as any other type of user notice to indicate that synthetic optical zoom is not supported for an image capture. The synthetic optical zoom may not be utilized in a dual camera system for any number of use scenarios that cause the camera device to initiate digital zoom in the alternative.

For example, parallax detection for autofocus may fail to derive the focus distance in the overlapped area of the preview image frames, one from each imager of the dual camera system. Similarly, one of the imagers of the dual camera system may not converge in autofocus to merge the two images, one from each of the imagers. Further, the two camera lenses may not be implemented with the same range of focus distance and the synthetic optical zoom is limited by the focus range limitations of the longer focal length camera lens. In another use scenario, the digital zoom may be initiated when a touch-to-focus feature is used and the region of interest, as indicated by a user of the camera device, is outside of the overlapped area of the two preview image frames, causing only the one imager that covers the selected region of interest to be used for zooming-in. Further, the digital zoom may also be initiated if one of the imagers has malfunctioned, preventing synthetic optical zoom from being utilized.

In aspects of dual camera system zoom notification, user options can be provided that enable the user of the camera device to select an option when one of the imagers of the dual camera system is not utilized for synthetic optical zoom, as implemented by the computational imaging algorithm. For example, a user may select to prevent the zoom feature all together, or the user may opt to resort to the digital zoom as the alternative to synthetic optical zoom when a zoom function is activated, but only the image from the operable imager is mathematically manipulated to achieve digital zoom.

While features and concepts of dual camera system zoom notification can be implemented in any number of different devices, systems, environments, and/or configurations, embodiments of dual camera system zoom notification are described in the context of the following example devices, systems, and methods.

FIG. 1 illustrates an example system 100 in which embodiments of dual camera system zoom notification can be implemented. The example system 100 includes a mobile device 102 that may be any type of mobile phone, tablet device, digital camera, or other type of computing and/or electronic device that includes a dual camera system 104. In this example, the dual camera system 104 is implemented as two imagers that each include a camera lens and an image sensor to capture a digital image as viewed through the camera lenses. A first imager 106 includes a camera lens 108 and an image sensor 110, and similarly, a second imager 112 includes a camera lens 114 and an image sensor 116. The optics of the camera lenses of the respective imagers are designed to support synthetic optical zoom with a computational imaging algorithm to zoom-in or zoom-out on a subject of a scene 118 that may then be captured as an image (e.g., a digital photo) with the imagers of the dual camera system.

This example illustrates that a user of the mobile device 102 can zoom-in on a subject of the scene 118 to create an optically-zoomed image 120. The optics of the camera lenses 108, 114 of the respective imagers 106, 112 are designed to support a computational imaging algorithm to generate a high-quality zoomed image, competitive with an optical zoomed image. The mobile device 102 that includes the dual camera system 104 can also digitally zoom the image to create a digitally-zoomed image 122 (e.g., a further zoom-in of the synthetic optically-zoomed image 120), such as when the synthetic optical zoom capability of the computational imaging algorithm has reached a limit. The digital zoom to create the digitally-zoomed image 122 is an image manipulation technique that can be implemented software and/or hardware, and can result in visual degradation of image quality (e.g., a blurry or pixelated image) that would otherwise be avoided with the synthetic optical zoom.

As described above, the dual camera system 104 of the mobile device 102 may not only apply the digital zoom when the synthetic optical zoom capability of the computational imaging algorithm has reached a limit. The dual camera system 104 may also automatically initiate the digital zoom in other use scenarios, such as if one of the camera lenses 108, 114 of the respective imagers 106, 112 has either temporarily or permanently malfunctioned. The user of the mobile device 102 may be unaware that the synthetic optical zoom is not operational or being utilized, resulting in a poorer image quality of the zoomed image 120, similar to that of the digitally-zoomed image 122.

In implementations, a user of the mobile device 102 can be notified when the synthetic optical zoom is not being utilized and/or when digital zoom has been initiated, particularly when the user is unaware that the synthetic optical zoom is not being utilized. For example, a message 124 can be displayed in a user interface 126 on the display of the mobile device, such as to indicate that one of the cameras (e.g., of the imagers) is not available for image capture, and digital zoom is being used. Generally, the message 124 is communicated to a user of the mobile device 102 to indicate that the synthetic optical zoom is not supported and/or to indicate that digital zoom is activated.

Additionally, the user of the mobile device 102 can be provided with selectable options 128 that enable the user to decide the zoom operation when one of the imagers 106, 112 of the dual camera system 104 is not operational for synthetic optical zoom. For example, a user may select to prevent the zoom feature all together, or the user may opt to resort to digital zoom as the alternative to the synthetic optical zoom when a zoom function is activated, but only one imager is operating properly to support digital zoom, and the malfunctioning imager is ignored. In this example, the selectable options 128 are displayed in the user interface 126 on the display of the mobile device and include a first selectable option to prevent a zoom feature of the dual camera system, and a second selectable option to initiate digital zoom of the image as an alternative to the synthetic optical zoom that is not supported.

Figure 2:
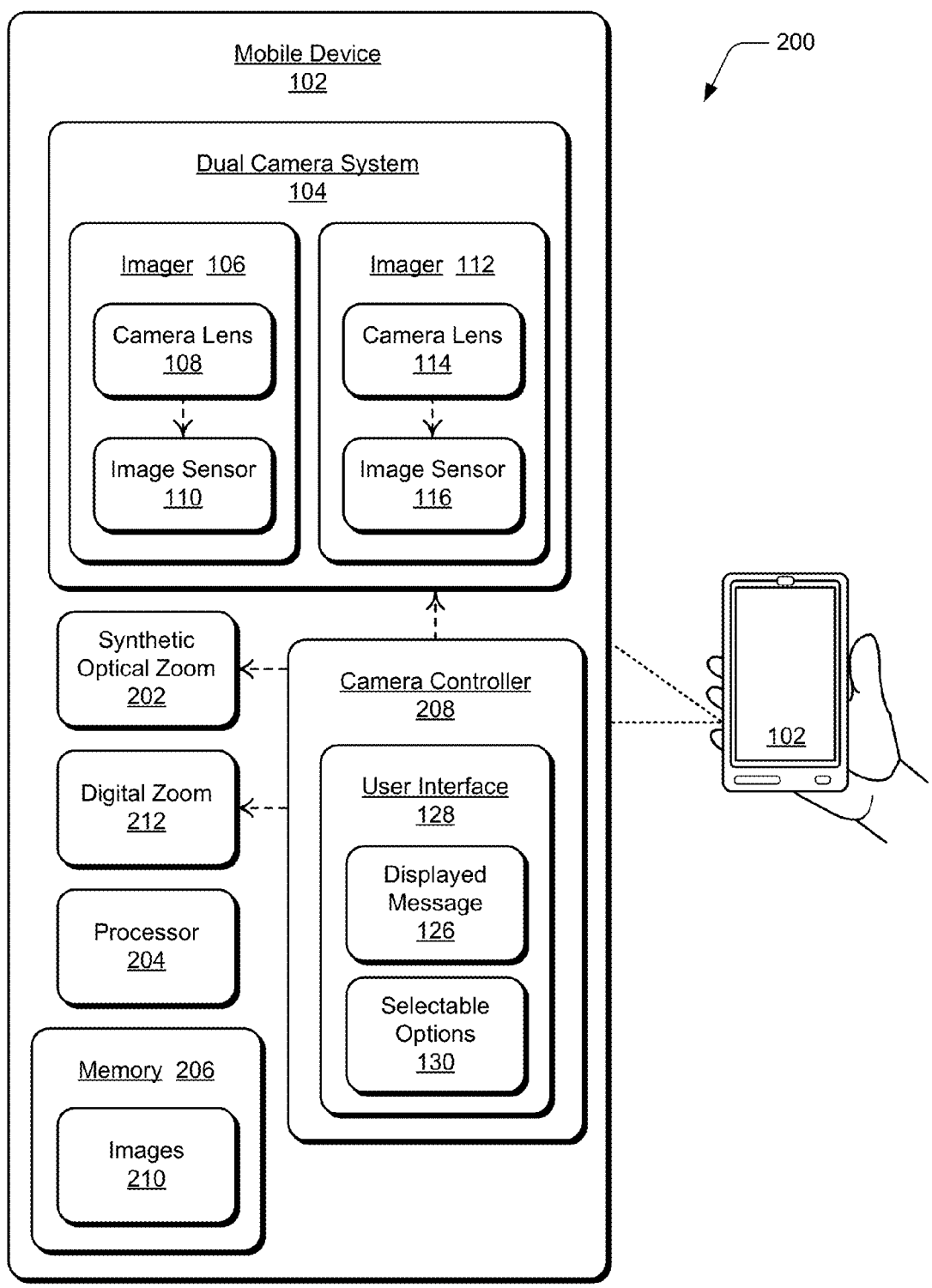
FIG. 2 illustrates an example of a mobile device with a dual camera system in which embodiments of dual camera system zoom notification can be implemented.

FIG. 2 further illustrates an example 200 of the mobile device 102 in which embodiments of dual camera system zoom notification can be implemented. The mobile device 102 includes the dual camera system 104, as shown and described with reference to FIG. 1. The dual camera system 104 implements the first imager 106, which includes the camera lens 108 and the image sensor 110, and the dual camera system implements the second imager 112, which includes the camera lens 114 and the image sensor 116. In implementations, one of the imagers of the dual camera system 104 is a standard camera with a standard angle of view, and the other imager is a camera with a narrower angle of view. A computational imaging algorithm for synthetic optical zoom 202 can be used to merge one image from the standard camera, and the other image from the second camera at the same scene to generate a high-quality zoomed image.

The mobile device 102 can also be implemented with various components, such as a processor 204 (or a processing system) and a memory 206, as well as with any number and combination of differing components as further described with reference to the example device shown in FIG. 4. Although not shown, the mobile device 102 also includes a power source, such as a battery and/or a wired power source, to power device components.

In this example, the mobile device 102 includes a camera controller 208 that can be implemented as a software application or module, such as executable software instructions (e.g., computer-executable instructions) that are executable with a processing system (e.g., the processor 204) of the device to implement embodiments of dual camera system zoom notification. The camera controller 208 can be stored on computer-readable storage memory (e.g., the device memory 206), such as any suitable memory device or electronic data storage implemented by the mobile device. The memory 206 can maintain images 210, such as image previews and images that are captured by the imagers 106, 112 of the dual camera system 104. The memory 206 can also maintain a software module or application that implements digital zoom 212 as a software image manipulation technique. Alternatively, the digital zoom 212 can be implemented in hardware, or as a combination of software and hardware in the mobile device. Similarly, the computational imaging algorithm for the synthetic optical zoom 202 can be implemented in software and/or hardware in the mobile device.

In embodiments, the camera controller 208 is implemented to determine that the synthetic optical zoom 202 is not supported to capture an image 210 of a scene, such as the scene 118 shown in FIG. 1, with the first imager 106 and the second imager 112 of the dual camera system 104. A determination by the camera controller 208 that the synthetic optical zoom 202 is not supported can be based on any number of use scenarios that cause a camera device to initiate the digital zoom 212 as an alternative to the synthetic optical zoom. For example, parallax detection for autofocus may fail to derive the focus distance in the overlapped area of preview image frames, one from each imager 106 and 112 of the dual camera system. Similarly, one of the imagers 106, 112 of the dual camera system 104 may not converge in autofocus to merge the two images, one from each of the imagers. Further, the two camera lenses 108 and 114 may not be implemented with the same range of focus distance and the synthetic optical zoom 202 is limited by the focus range limitations of the longer focal length camera lens. In another use scenario, the digital zoom 212 may be initiated when a touch-to-focus feature is used and the region of interest, as indicated by a user of the mobile device, is outside of the overlapped area of the two preview image frames, causing only the one imager that covers the selected region of interest to be used for zooming-in. Further, the digital zoom 212 may also be initiated if one of the imagers 106, 112 has malfunctioned, preventing the synthetic optical zoom 202 from being utilized.

The camera controller 208 is also implemented to initiate a message for a user of the mobile device 102 to indicate that the synthetic optical zoom 202 is not supported to capture an image and/or when the digital zoom 212 is initiated. A message can be provided for the user, such as in the form of the displayed message 124, a displayed symbol or image, as an audio indication, a haptic feedback, and/or as any other type of user notice to indicate that the synthetic optical zoom is not supported for an image capture.

The camera controller 208 is also implemented to provide the selectable options 128 for use of the digital zoom 212 as an alternative to the synthetic optical zoom 202 that may not supported to capture an image. As described above, a user of the mobile device 102 can be provided with the selectable options 128 that enable the user to decide the zoom operation when one or both of the imagers 106, 112 of the dual camera system 104 are not operational to support the synthetic optical zoom, as implemented by a computational imaging algorithm. For example, the user may select to prevent the zoom feature all together, or the user may opt to resort to the digital zoom 212 as the alternative to the synthetic optical zoom 202 when a zoom function is activated, but only one of the imagers is operating properly to support digital zoom, and the malfunctioning imager is ignored.

Example method 300 is described with reference to FIG. 3 in accordance with implementations of dual camera system zoom notification. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
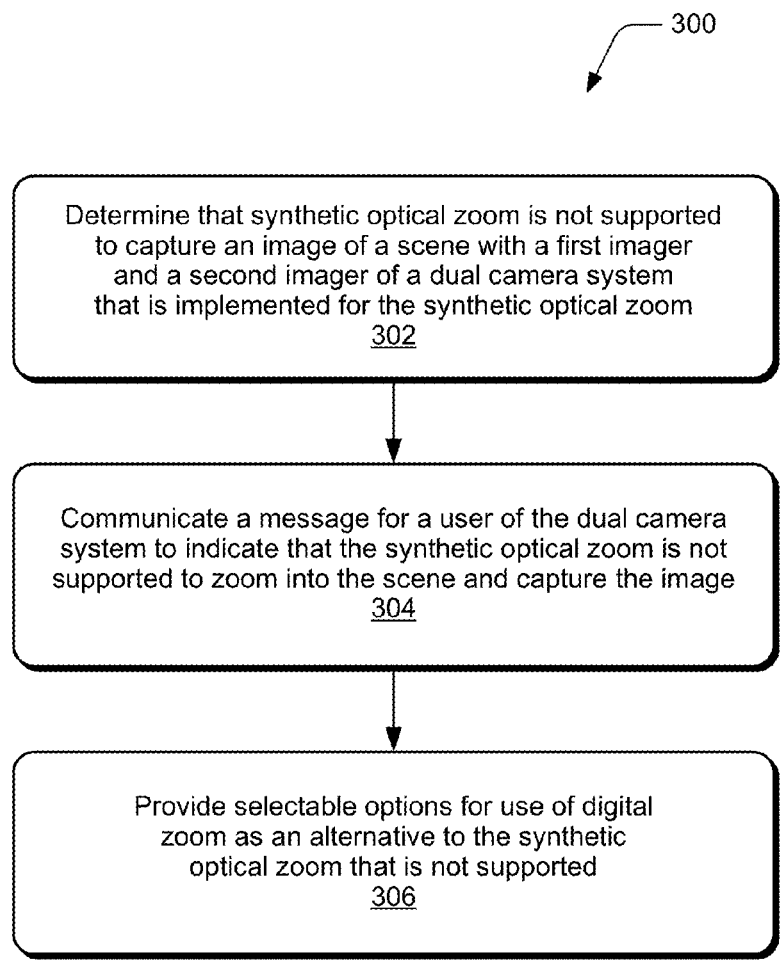
FIG. 3 illustrates an example method of dual camera system zoom notification in accordance with one or more embodiments of the techniques described herein.

FIG. 3 illustrates example method(s) 300 of dual camera system zoom notification and is generally described with reference to the camera controller implemented by the mobile device that includes the dual camera system, as shown and described with reference to FIGS. 1 and 2. The order in which the method is described is not intended to be construed as a limitation, and any number or combination of the described method operations can be performed in any order to perform a method, or an alternate method.

At 302, a determination is made that a synthetic optical zoom is not supported to capture an image of a scene with a first imager and a second imager of a dual camera system that is implemented for the synthetic optical zoom. For example, the camera controller 208 that is implemented by the mobile device 102 determines that the synthetic optical zoom 202 is not supported to capture an image 210 of the scene 118 with the first imager 106 and the second imager 112 of the dual camera system 104. A determination by the camera controller 208 that the synthetic optical zoom 202 is not supported can be based on any number of use scenarios that cause a camera device to initiate the digital zoom 212 as an alternative to the synthetic optical zoom.

The synthetic optical zoom 202 may not be supported due to an autofocus failure to derive a focus distance of a scene object, or based on the first imager 106 and/or the second imager 112 failure to converge in autofocus. The synthetic optical zoom 202 also may not be supported due to a malfunction of the first imager 106 and/or the second imager 112. The synthetic optical zoom 202 may also not be supported based on a focus range limitation of the camera lens 108 (e.g., of the first imager 106) or the camera lens 114 (e.g., of the second imager 112) having a longer focal length. The synthetic optical zoom 202 may also not be supported based on a touch-to-focus feature of a selected region of interest being outside of an overlapping image area by the first imager and the second imager.

At 304, a message is communicated for a user of the dual camera system to indicate that the synthetic optical zoom is not supported to zoom into the scene and capture the image. For example, the camera controller 208 that is implemented by the mobile device 102 communicates (or otherwise provides) a message for a user of the mobile device 102 to indicate that the synthetic optical zoom 202 is not supported to zoom into the scene 118 and capture an image and/or when the digital zoom 212 is initiated. The message can be communicated as the displayed message 124 to indicate that the synthetic optical zoom 202 is not supported and/or that the digital zoom 212 is activated. Alternatively or in addition to a displayed message, the message may be communicated as a displayed symbol or image, an audio indication, as haptic feedback, and/or as another type of message that indicates the synthetic optical zoom 202 is not supported.

At 306, selectable options for use of digital zoom are provided as an alternative to the synthetic optical zoom that is not supported. For example, the camera controller 208 that is implemented by the mobile device 102 provides the selectable options 128 for use of the digital zoom 212 as an alternative to the synthetic optical zoom 202 that may not be supported to capture an image. In an implementation, the selectable options 128 include a first selectable option to prevent the digital zoom 212 of the dual camera system 104, and include a second selectable option to initiate the digital zoom 212 of a captured image 210 of a scene as an alternative to the synthetic optical zoom 202 that is not supported.

Figure 4:
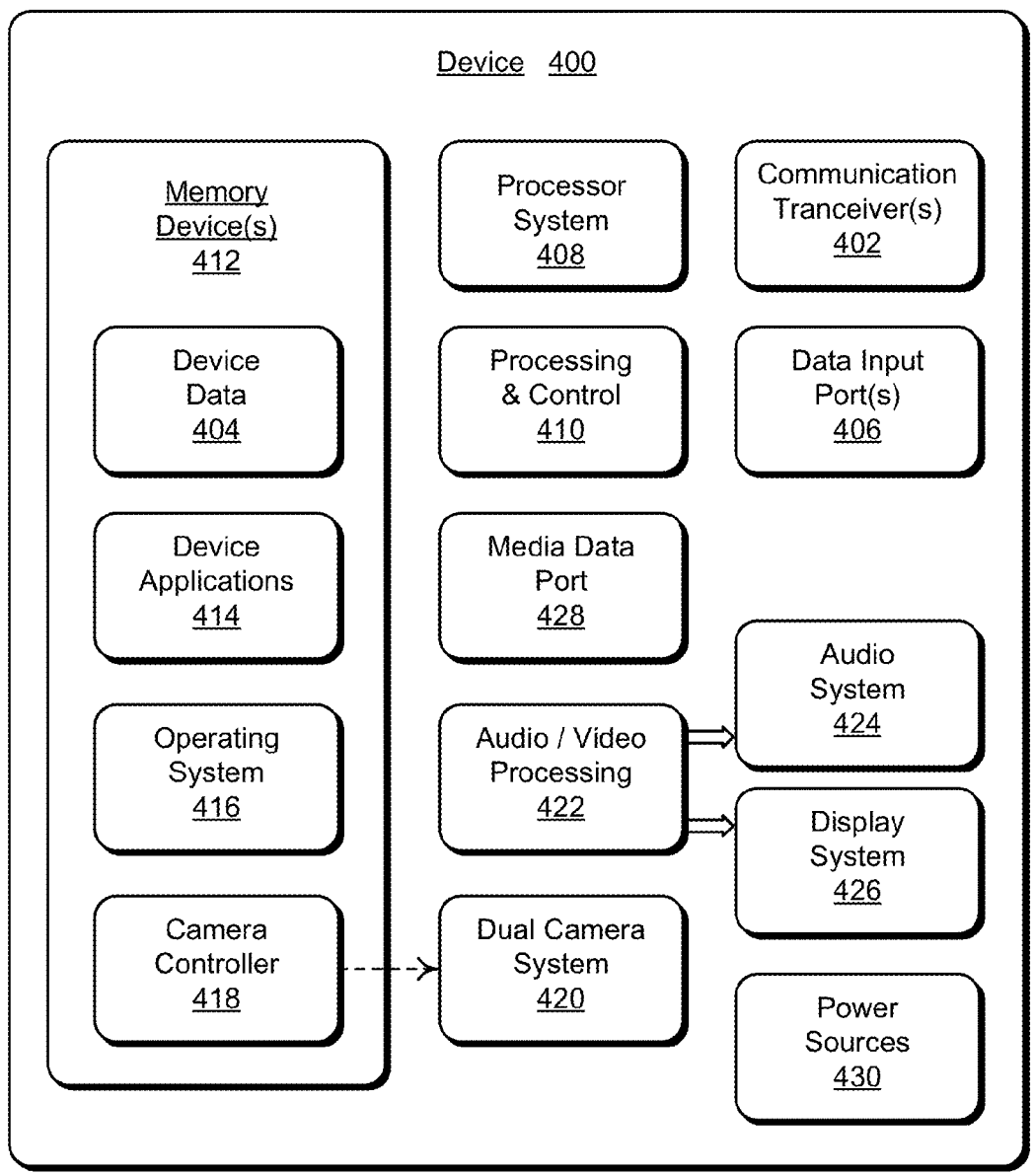
FIG. 4 illustrates various components of an example device that can implement embodiments of dual camera system zoom notification.

FIG. 4 illustrates various components of an example device 400 in which embodiments of dual camera system zoom notification can be implemented. The example device 400 can be implemented as any mobile device described with reference to the previous FIGS. 1-3, such as any type of client device, mobile phone, tablet, camera, computing, communication, entertainment, gaming, media playback, and/or other type of device that includes a dual camera system. For example, the mobile device 102 shown in FIG. 1 may be implemented as the example device 400.

The device 400 includes communication transceivers 402 that enable wired and/or wireless communication of device data 404 with other devices, and the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 400 may also include one or more data input ports 406 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 400 includes a processing system 408 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 410. The device 400 may further include any type of a system bus or other data and command transfer system that couples the various components within the device. A system bus can include any one or combination of different bus structures and architectures, as well as control and data lines.

The device 400 also includes computer-readable storage memory 412 that enable data storage, such as data storage devices that can be accessed by a computing device, and that provide persistent storage of data and executable instructions (e.g., software applications, programs, functions, and the like). Examples of the computer-readable storage memory 412 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 400 may also include a mass storage media device.

A computer-readable storage memory 412 provides data storage mechanisms to store the device data 404, other types of information and/or data, and various device applications 414 (e.g., software applications). For example, an operating system 416 can be maintained as software instructions with a memory device and executed by the processing system 408. The device applications may also include a device manager, such as any form of a control application, software application, signal-processing and control module, code that is native to a particular device, a hardware abstraction layer for a particular device, and so on. In this example, the device 400 includes a camera controller 418 that implements embodiments of dual camera system zoom notification and controls a dual camera system 420 of the device. The camera controller 418 may be implemented with hardware components or in software, such as when the device 400 is implemented as the mobile device 102 described with reference to FIGS. 1-3. An example of the camera controller 418 is the camera controller 208 that controls the dual camera system 104 implemented by the mobile device 102.

The device 400 also includes an audio and/or video processing system 422 that generates audio data for an audio system 424 and/or generates display data for a display system 426. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 428. In implementations, the audio system and/or the display system are integrated components of the example device. Alternatively, the audio system and/or the display system are external, peripheral components to the example device.

The device 400 can also include one or more power sources 430, such as when the device is implemented as a mobile device. The power sources may include a charging and/or power system, and can be implemented as a flexible strip battery, a rechargeable battery, a charged super-capacitor, and/or any other type of active or passive power source.

Although embodiments of dual camera system zoom notification have been described in language specific to features and/or methods, the subject of the appended claims is not necessarily limited to the specific features or methods described. Rather, the specific features and methods are disclosed as example implementations of dual camera system zoom notification, and other equivalent features and methods are intended to be within the scope of the appended claims. Further, various different embodiments are described and it is to be appreciated that each described embodiment can be implemented independently or in connection with one or more other described embodiments.

The invention claimed is:
1. A dual camera system, comprising:
a first imager designed to support synthetic optical zoom of a scene, wherein the first imager comprises a camera with a first angle of view;
a second imager designed to support the synthetic optical zoom of the scene in conjunction with the first imager, wherein the second imager comprises a camera with a narrower angle of view than the first imager, and wherein the synthetic optical zoom merges the image from the first imager and the image from the second imager at the same scene to generate a zoomed image;

a camera controller comprising one or more computer-readable media embodying instructions which are configured to:
  determine that the synthetic optical zoom is not supported to capture an image of the scene with the dual camera system; and
  initiate a message for a user of the dual camera system to indicate that the synthetic optical zoom is not supported to capture the image of the scene.

2. The dual camera system as recited in claim 1, wherein the camera controller is configured to initiate selectable options, comprising:
  a first selectable option to prevent a zoom feature of the dual camera system; and
  a second selectable option to initiate digital zoom of a captured image of the scene as an alternative to the synthetic optical zoom that is not supported.

3. The dual camera system as recited in claim 1, wherein the message is displayed to indicate that the synthetic optical zoom is not supported.

4. The dual camera system as recited in claim 3, wherein the message is further displayed to indicate that digital zoom is activated.

5. The dual camera system as recited in claim 1, wherein the message for the user is communicated as at least one of a displayed message, an audio indication, or haptic feedback that indicates the synthetic optical zoom is not supported.

6. The dual camera system as recited in claim 1, wherein the camera controller is configured to said determine that the synthetic optical zoom is not supported based on an autofocus failure to derive a focus distance of the scene.

7. The dual camera system as recited in claim 1, wherein the camera controller is configured to said determine that the synthetic optical zoom is not supported based on one of the first imager or the second imager failure to converge in autofocus.

8. The dual camera system as recited in claim 1, wherein:
  the first imager includes a first camera lens and the second imager includes a second camera lens; and
  the camera controller is configured to said determine that the synthetic optical zoom is not supported based on a focus range limitation of one of the first camera lens or the second camera lens having a longer focal length.

9. The dual camera system as recited in claim 1, wherein the camera controller is configured to said determine that the synthetic optical zoom is not supported based on a malfunction of one of the first imager or the second imager.

10. A dual camera system as recited in claim 1, wherein the camera controller is configured to said determine that the synthetic optical zoom does not support a touch-to-focus feature based on a selected region of interest being outside of an overlapping image area of the first imager and the second imager.

11. A method, comprising:
  determining that synthetic optical zoom is not supported to capture an image of a scene with at least one of a first imager or a second imager of a dual camera system designed for the synthetic optical zoom, wherein the synthetic optical zoom merges the image from the first imager and the image from the second imager at the same scene to generate a zoomed image;
  communicating a message for a user of the dual camera system to indicate that the synthetic optical zoom is not supported to zoom into the scene and capture the image; and
  providing selectable options for use of digital zoom as an alternative to the synthetic optical zoom that is not supported.

12. The method as recited in claim 11, wherein the selectable options include:
  a first selectable option to prevent the digital zoom of the dual camera system; and
  a second selectable option to initiate the digital zoom of a captured image of the scene as an alternative to the synthetic optical zoom that is not supported.

13. The method as recited in claim 11, wherein the message is displayed to indicate that the synthetic optical zoom is not supported and the digital zoom is activated.

14. The method as recited in claim 11, wherein said determining that the synthetic optical zoom is not supported is based on an autofocus failure to derive a focus distance of the scene.

15. The method as recited in claim 11, wherein said determining that the synthetic optical zoom is not supported is based on one of the first imager or the second imager failure to converge in autofocus.

16. The method as recited in claim 11, wherein said determining that the synthetic optical zoom is not supported is based on a malfunction of one of the first imager or the second imager.

17. The method as recited in claim 11, wherein:
  the first imager includes a first camera lens and the second imager includes a second camera lens; and
  said determining that the synthetic optical zoom is not supported is based on a focus range limitation of one of the first camera lens or the second camera lens having a longer focal length.

18. The method as recited in claim 11, wherein said determining that the synthetic optical zoom is not supported is based on a determination that the synthetic optical zoom does not support a touch-to-focus feature based on a selected region of interest being outside of an overlapping image area of the first imager and the second imager.

19. A mobile device, comprising:
  a dual camera system that includes a first imager, wherein the first imager comprises a camera with a first angle of view, and a second imager, wherein the second imager comprises a camera with a narrower angle of view than the first imager, the dual camera system designed to support synthetic optical zoom and digital zoom, wherein the synthetic optical zoom merges the image from the first imager and the image from the second imager at the same scene to generate a zoomed image;
  a memory and processor system to implement a camera controller that is configured to:
  determine that the synthetic optical zoom is not supported to capture an image of a scene with the dual camera system; and
  initiate a message for a user of the mobile device to indicate that the synthetic optical zoom is not supported to capture the image of the scene.

20. The mobile device as recited in claim 19, wherein the camera controller is configured to provide selectable options for use of the digital zoom as an alternative to the synthetic optical zoom that is not supported.

* * * * *